No. 833,177. PATENTED OCT. 16, 1906.
D. H. REIMERS.
POWER TRANSMITTING MECHANISM.
APPLICATION FILED NOV. 3, 1905.

2 SHEETS—SHEET 1.

Witnesses:
Chas. E. Gorton
M. A. Nyman

Inventor:
Dycke H. Reimers
By Chas. C. Tillman
Atty.

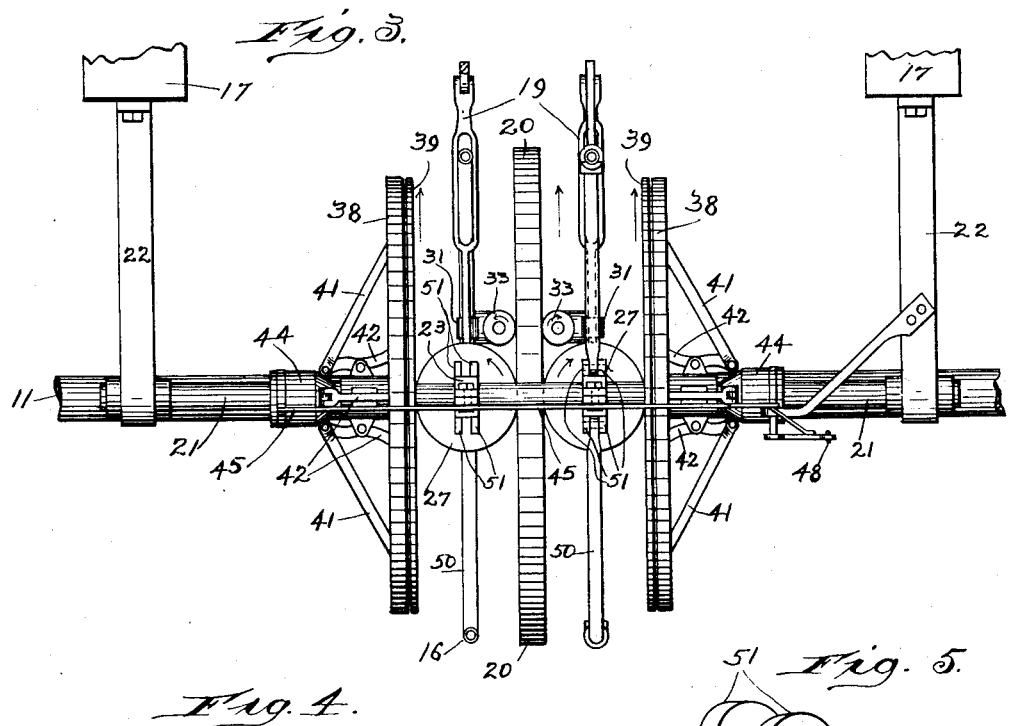
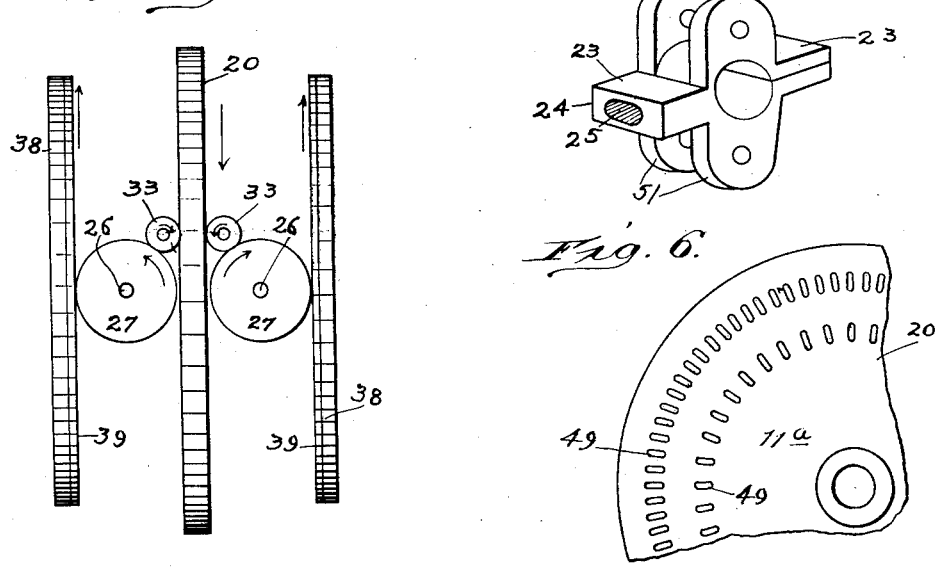

UNITED STATES PATENT OFFICE.

DYCKE H. REIMERS, OF CHICAGO, ILLINOIS, ASSIGNOR OF ONE-HALF TO JOHN BIFFAR, OF NEW YORK, N. Y.

POWER-TRANSMITTING MECHANISM.

No. 833,177.     Specification of Letters Patent.     Patented Oct. 16, 1906.

Application filed November 3, 1905. Serial No. 285,724.

*To all whom it may concern:*

Be it known that I, DYCKE H. REIMERS, a citizen of the United States, residing at Chicago, in the county of Cook and State of Illinois, have invented certain new and useful Improvements in Power-Transmitting Mechanism, of which the following is a specification.

This invention relates to certain new and useful improvements in a mechanism to be used for the transmission of power and for reversing the movement of the machine, as well as for regulating and controlling the speed thereof, and while it is more especially intended to be employed in connection with and for the transmission of power in driving automobiles, yet it is applicable for the transmission of power for other purposes; and it consists in certain peculiarities of the construction, novel arrangement, and operation of the various parts thereof, as will be hereinafter more fully set forth and specifically claimed.

The principal object of the invention is to provide simple and efficient means for transmitting and directly applying power to the rear axle of an automobile or the driven shaft of a machine.

Another object of the invention is to furnish an improved power-transmitting mechanism whereby the power is transmitted by the frictional contact of certain parts thereof, which shall be so constructed as to utilize the pressure or power employed to hold the frictional members in contact, (which ordinarily produces what is termed an "end thrust,") so that the more pressure or power employed will serve to increase the friction on each side of the driven wheel, thereby avoiding any end thrust or lateral movement of said wheel and also preventing the bearing thereof becoming worn.

Other objects and advantages of the invention will be disclosed in the subjoined description and explanation.

In order to enable others skilled in the art to which my invention pertains to make and use the same, I will now proceed to describe it, referring to the accompanying drawings, in which—

Figure 1:
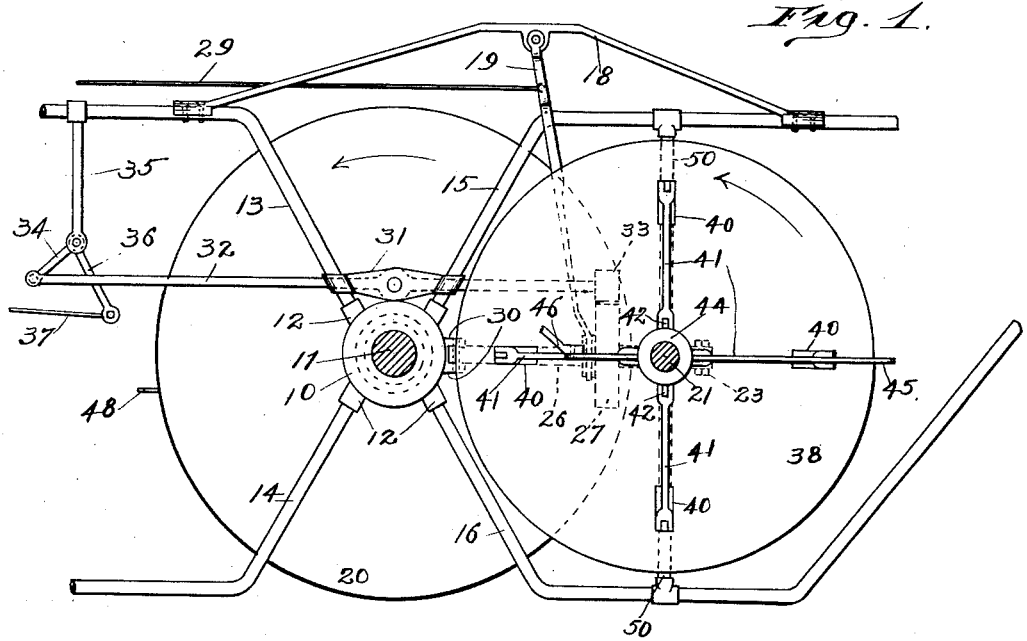
Figure 2:
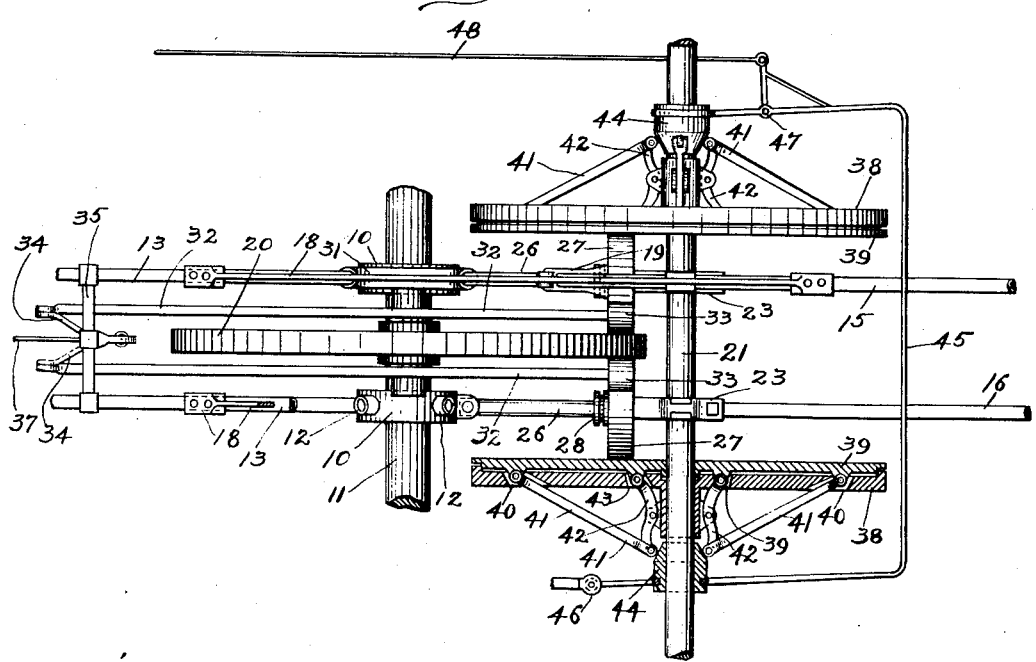

Figure 1 is a view in side elevation of a power-transmitting mechanism embodying the invention, showing a portion of the supporting-frame on which it is mounted. Fig. 2 is a plan view thereof, partly in elevation and partly in section, but showing a portion of the supporting-frame removed. Fig. 3 is a rear end view in elevation, showing the positions the parts will occupy when operating to drive the machine forwardly or in one direction. Fig. 4 is a diagrammatic view of the friction elements, illustrating them in the positions they will occupy when the movement of the machine is reversed. Fig. 5 is an enlarged perspective view of one of the brackets which support the rear ends of the shafts on which certain frictional members are movably mounted; and Fig. 6 is a fragmental face view of the driven disk, showing a modification in its construction.

Like numerals of reference refer to corresponding parts throughout the different views of the drawings.

The supporting-frame for the mechanism may be of the ordinary or any preferred construction; but in the present instance I have shown it as comprising two portions which are counterparts of one another, each of which consists of a collar 10, loosely mounted at a suitable distance apart on the rear axle 11 of the automobile when the mechanism is employed for driving the same, and a number of rods or pieces of pipe which are fitted at their inner ends in socketed projections 12 on each of the said collars. As is clearly shown in Fig. 1 of the drawings, these pipes, rods, or bars are arranged so that two of them, 13 and 14, will extend forwardly from the axle 11, while the other two, 15 and 16, extend rearwardly from the rear axle. It will also be observed and understood that the rod 13 of each of the portions of the supporting-frame extends upwardly and forwardly, while the rod 15 of each of said portions extends upwardly and rearwardly, while the rod 14 extends downwardly and forwardly and the rod 16 downwardly and rearwardly and then upwardly. These rods or pieces of pipe may be secured to any suitable support, such as beams 17 or the bed-frame of the automobile. The rods 13 and 15 of each of the portions of the supporting-frame are united by means of a truss 18, to each of which is pivotally secured the upper end of a yoke 19, the functions of which will be presently explained.

Mounted on the axle 11 between the collars 10 is the driven friction-disk 20, which may be covered or provided on its faces with fiber or other suitable frictional material. Horizontally journaled in parallelism with the axle or shaft 11 and near the same is the main or driving shaft 21, which may be supported by means of brackets 22, secured to beams 17 or other suitable supports. The shaft 21 is connected in any suitable manner to an engine (not shown) and has loosely mounted on its middle portion two boxes or brackets 23, each of which is provided with a forwardly-extending projection 24, having in its free end a horizontally-elongated opening 25 for the reception of the rear ends of the shafts 26, on each of which shafts is mounted a friction-disk 27, which will be herein designated as the "intermediate direct-drive" disks. Each of these disks is provided with a grooved hub 28 to engage the lower ends of the yokes 19, which, as before stated, are pivotally secured at their upper ends to a part of the supporting-frame—for example, the trusses 18—and said yokes may be operated by means of a rod 29, so that the disks 27 may be slid back and forth on the shafts 26 when it is desired to change the rate of speed of the machine. The front end of each of the shafts 26 is pivotally secured between lugs 30 on each of the collars 10, so that said shafts may have a slight lateral movement within the openings 25 of the boxes or brackets 23 therefor. Just above each of the collars 10 the rods 13 and 15 are connected together by means of a bar 31, on which is fulcrumed a lever-shaft 32, on the rear end of each of which is journaled a small friction disk or roller 33, used for reversing the movement of the machine and which will be called the "intermediate reversing" disks or rollers. The front end of each of the lever-shafts 32 is pivotally connected to one of the shorter arms 34 of a bell-crank lever, which is fulcrumed on a suitable support 35 on the front part of the supporting-frame. As shown, Fig. 2, the bell-crank lever is provided with two short arms which diverge from its fulcrum, and said lever has connected to its longer arm 36 an operating-rod 37, which is employed to lower the intermediate reversing-disks 33 to the positions shown in Fig. 4 when it is desired to reverse the movement of the machine. Mounted on the driving-shaft 21 near the outer surface of each of the intermediate direct-drive disks 27 is a direct-drive disk which consists of a disk 38, rigidly secured on said shaft, and a disk 39, which is slidably mounted on the driving-shaft. Each of the disks 38 is provided near its periphery with a series of openings 40, through which are extended bars 41, which are pivotally secured at their outer ends to lugs on the disk 39 and have their other ends pivotally secured to the outer ends of levers 42, which are fulcrumed on the hub of the disk 39 and have their inner ends passing through suitable openings 43 in the disk 38 and pivotally secured to the disk 39, as is clearly shown in Fig. 2 of the drawings. Slidably mounted on the driving-shaft 21 outwardly from each of the hubs of the disks 38 is a cone-sleeve 44, which sleeves are united by means of a yoke 45, which is fulcrumed, as at 46 and 47, (see Fig. 2,) and has connected to one of its sides an operating-rod 48, by means of which the sleeves may be slid toward each other, so as to move the inner ends of the bars 41 and levers 42 outwardly, thereby moving the disks 39 toward each other and against the disks 27, which in turn are pressed against the driven disk 20 with a uniform pressure, thus neutralizing or avoiding any lateral movement of the driven disk, or what is ordinarily termed the "end thrust" thereof. It is also apparent that by the arrangement of the bars 41 and levers 42, which actuate the disks 39, the pressure on said disks will be so distributed as to avoid the lateral movement thereof, as well as a similar movement of the disks 38, which, as before stated, are rigidly secured on the driving-shaft.

When it is desired to drive the machine in a forwardly direction, the operating-rod 48 should be moved in the proper direction to cause the sleeves 44 to be moved toward each other, which operation, through the instrumentality of the bars 41 and levers 42, will slide the disks 38 on the shaft 21 toward each other and against the intermediate direct-drive disks 27, which in turn will be forced against the driven disk 20, thereby causing the same to be rotated, the speed of which may be regulated or controlled by moving the yokes 19 by means of the operating-rods 29 in the proper direction, which yokes, as before stated, engage the hubs of the disks 27, so as to slide them back and forth on the shafts 26, which carry said disks. When it is desired to reverse the movement of the machine, the operating-rod 37 may be moved in the proper direction to lower the inner ends of the lever-shafts 32, which carry the intermediate reversing-disks 33, so that the same will be brought into contact with the disks 27 on their surfaces adjacent to the driven disk 20, which operation will produce the reverse movement of the driven disk as well as of the machine.

In Fig. 6 of the drawings I have shown a modified form 11ª of the driven disk, which consists in providing each of its faces with a series of indentations or cups 49, which are preferably arranged in concentric circles or rows and are preferably elongated, as shown. These depressions or indentations are employed to augment the friction incident to the intermediate disks and the driven disk, for it is apparent that as the intermediate disks contact with the faces of the driven disk over the indentations and pass from the same an exhaust of suction will take place, thus preventing the disks slipping. It will be understood that the intermediate disks, as well as the disks 39, may be provided with fiber or other suitable frictional material on their contacting surfaces and that the driven disk 20 may or may not be provided with such material. To support the brackets or boxes 23, rods 50, secured at one of their ends to the supporting-frame and at their other ends to the lugs 51 on said boxes, are employed.

While I have shown and above described the mechanism with the driving power applied to the shaft 21, yet it is evident that the shaft 11 may be connected to the engine or source of power, in which event the disk 20 would become the driving-disk and the disks mounted on the shaft 21 would become the driven disks.

Having thus fully described my invention, what I claim as new, and desire to secure by Letters Patent, is—

1. In a power-transmitting mechanism, the combination with the supporting-frame, of a driven disk journaled thereon, a driving-shaft journaled near the shaft of the driven disk, a direct-drive disk slidably mounted on the driving-shaft on each side of the driven disk, means to move said drive-disks back and forth, a shaft located longitudinally on the supporting-frame on each side of the driven disk and having one of its ends pivotally secured and its other end movably supported, an intermediate direct-drive disk slidably mounted on each of said longitudinal shafts, and means to slide said intermediate disks back and forth on their shafts, substantially as described.

2. In a power-transmitting mechanism, the combination with the supporting-frame, of a driven disk journaled thereon, a driving-shaft journaled near the shaft of the driven disk, a direct-drive disk slidably mounted on the driving-shaft on each side of the driven disk, means to move said drive-disks back and forth, an intermediate direct-drive disk movably journaled on each side of the driven disk and at right angles to the faces thereof, means to move said intermediate disks, an intermediate reversing-disk journaled on each side of the driven disk near the intermediate drive-disks, and means to throw said reversing-disks into contact with the driven disk and intermediate drive-disks, substantially as described.

3. In a power-transmitting mechanism, the combination with the supporting-frame, of a driven disk journaled thereon, a driving-shaft journaled near the shaft of the driven disk, a direct-drive disk slidably mounted on the driving-shaft on each side of the driven disk, means to move said drive-disks back and forth, an intermediate direct-drive disk movably journaled on each side of the driven disk and at right angles to the faces thereof, means to move said intermediate disks, an intermediate reversing-disk journaled on each side of the driven disk above the intermediate drive-disks, and means to throw the reversing-disks into contact with the intermediate drive-disks, substantially as described.

4. In a power-transmitting mechanism, the combination with the supporting-frame, of a driven disk journaled thereon, a driving-shaft journaled near the shaft of the driven disk, a direct-drive disk slidably mounted on the driving-shaft on each side of the driven disk, means to move said drive-disks toward the driven disk, an intermediate direct-drive disk movably journaled on each side of the driven disk and between it and the direct-drive disks, means to move said intermediate disks, a lever-shaft located on each side of the driven disk, an intermediate reversing-disk journaled on the rear end of each of said lever-shafts, and means to operate said lever-shafts so as to throw the reversing-disks into contact with the intermediate direct-drive disks, substantially as described.

5. In a power-transmitting mechanism, the combination with the supporting-frame, of a driven disk journaled thereon, a driving-shaft journaled near the shaft of the driven disk, a direct-drive disk mounted on the driving-shaft on each side of the driven disk, each of said drive-disks consisting of an apertured disk fixed on the drive-shaft and another disk slidably mounted on said shaft, connections pivotally uniting each of the slidable disks to the hub of each of said fixed disks, a cone-sleeve slidably mounted on the drive-shaft on the outside of each of the fixed disks thereon and adapted to coöperate with said connections, means to move said sleeves back and forth, an intermediate direct-drive disk movably journaled on each side of the driven disk, and means to move said intermediate disks, substantially as described.

6. In a power-transmitting mechanism, the combination with the supporting-frame, of a driven disk journaled thereon, a driving-shaft journaled near the shaft of the driven disk, a direct-drive disk mounted on the driving-shaft on each side of the driven disk, each of said drive-disks consisting of an apertured disk fixed on the driven shaft and another disk slidably mounted on said shaft, connections pivotally uniting each of the slidable disks to the hub of each of said fixed disks, a cone-sleeve slidably mounted on the driving-shaft on the outside of each of the fixed disks thereon and adapted to coöperate with said connections, means to move said sleeves back and forth, an intermediate direct-drive disk movably journaled on each side of the driven disk, means to move said intermediate disks, an intermediate reversing-disk journaled on each side of the driven disk, and means to throw the reversing-disks into contact with the intermediate drive-disks, substantially as described.

7. In a power-transmitting mechanism, the combination with the supporting-frame, of a driven disk journaled thereon, a driving-shaft journaled near the shaft of the driven disk, a direct-drive disk slidably mounted on the driving-shaft on each side of the driven disk, means to move said drive-disks back and forth on the driving-shaft, a shaft located on the supporting-frame on each side of the driven disk and having one of its ends pivotally secured and its other end movably supported, an intermediate direct-drive disk slidably mounted on each of said longitudinal shafts, means to slide said intermediate disks back and forth on their shafts, a lever-shaft longitudinally located on each side of the driven disk, an intermediate reversing-disk journaled on the rear portion of each of said lever-shafts, and means to operate said lever-shafts so as to throw the reversing-disks into contact with the intermediate direct-drive disks, substantially as described.

8. In a power-transmitting mechanism, the combination with the supporting-frame, of a driven disk journaled thereon, a driving-shaft journaled near the shaft of the driven disk, a direct-drive disk mounted on the driving-shaft on each side of the driven disk, each of said drive-disks consisting of an apertured disk fixed on the drive-shaft and another disk slidably mounted on said shaft, a number of levers fulcrumed on the hub of each of the said fixed disks and pivotally secured at their inner ends to each of the said slidable disks, a series of bars pivotally secured at their inner ends to the outer ends of said levers and at their outer ends to each of the slidable disks, a cone-sleeve slidably mounted on the driving-shaft on the outside of each of the fixed disks thereon and adapted to coöperate with said levers and bars, a yoke suitably fulcrumed and connecting the cone-sleeves, an operating-rod connected to the yoke for operating the same, an intermediate direct-drive disk movably journaled on each side of the driven disk, and means to move said intermediate disks, substantially as described.

9. In a power-transmitting mechanism, the combination with the supporting-frame, of a driven disk journaled thereon, a driving-shaft journaled near the shaft of the driven disk, a direct-drive disk mounted on the driving-shaft on each side of the driven disk, each of said drive-disks consisting of an apertured disk fixed on the drive-shaft and another disk slidably mounted on said shaft, a number of levers fulcrumed on the hub of each of the said fixed disks and pivotally secured at their inner ends to each of the said slidable disks, a series of bars pivotally secured at their inner ends to the outer ends of said levers and at their outer ends to each of the slidable disks, a cone-sleeve slidably mounted on the driving-shaft on the outside of each of the fixed disks thereon and adapted to coöperate with said levers and bars, a yoke suitably fulcrumed and connecting the cone-sleeves, an operating-rod connected to the yoke for operating the same, an intermediate direct-drive disk movably journaled on each side of the driven disk, means to move said intermediate disks, an intermediate reversing-disk journaled on each side of the driven disk, and means to throw the reversing-disks into contact with the intermediate drive-disks, substantially as described.

10. In a power-transmitting mechanism, the combination with the supporting-frame, of a driven disk journaled thereon, a driving-shaft journaled near the shaft of the driven disk, a direct-drive disk slidably mounted on the driving-shaft on each side of the driven disk, means to move said drive-disks toward the driven disk, a shaft located longitudinally on the supporting-frame on each side of the driven disk and having one of its ends pivotally secured and its other end movably supported, an intermediate direct-drive disk slidably mounted on each of said longitudinal shafts, a yoke located on each side of the driven disk and pivotally secured at its upper end and engaging the hub of each of the intermediate drive-disks with its lower end, and means to operate said yokes, substantially as described.

11. In a power-transmitting mechanism, the combination with the supporting-frame, of a driven disk journaled thereon, a driving-shaft journaled near the shaft of the driven disk, a direct-drive disk slidably mounted on the driving-shaft on each side of the driven disk, means to move said drive-disks back and forth, a shaft located on the supporting-frame on each side of the driven disk and having one of its ends pivotally secured and its other end movably supported, an intermediate direct-drive disk slidably mounted on each of said longitudinal shafts, a yoke located on each side of the driven disk and pivotally secured at its upper end and engaging the hub of each of the intermediate drive-disks with its lower end, means to operate said yokes, a lever-shaft longitudinally located on each side of the driven disk, an intermediate reversing-disk journaled on the rear portion of each of said lever-shafts, a bell-crank lever fulcrumed on the supporting-frame and connected to the front portions of the lever-shafts, and an operating-rod connected to one of the arms of the bell-crank lever, substantially as described.

DYCKE H. REIMERS.

Witnesses:
CHAS. C. TILLMAN,
M. A. NYMAN.